July 22, 1924.
W. C. HERSHEY ET AL
1,502,193
HEADLIGHT SWITCH OPERATING DEVICE FOR MOTOR VEHICLES
Filed Sept. 11, 1922
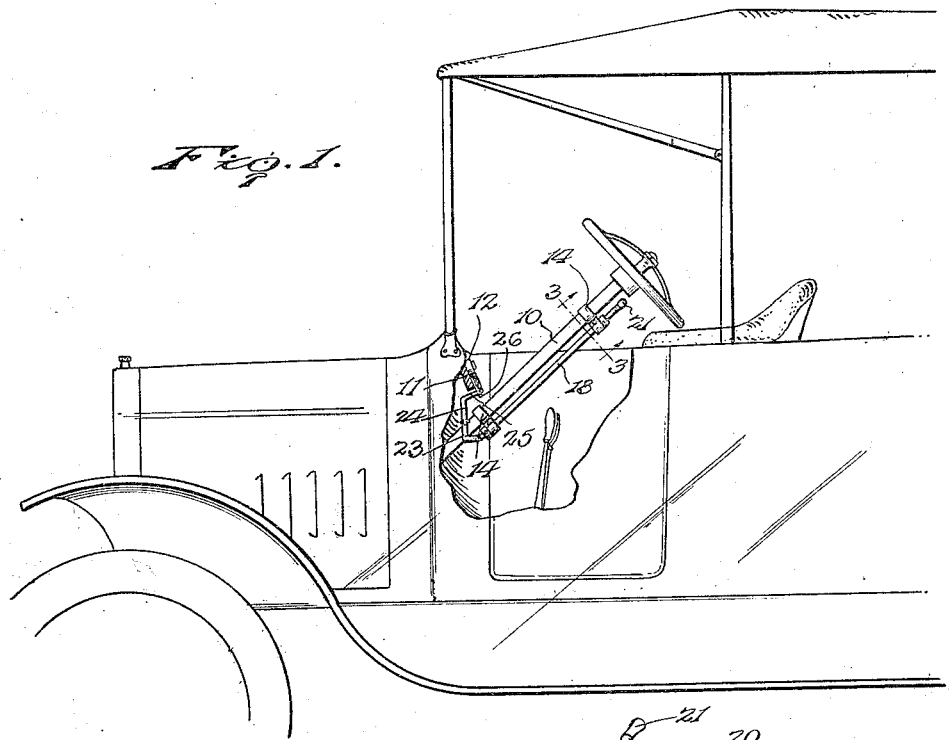
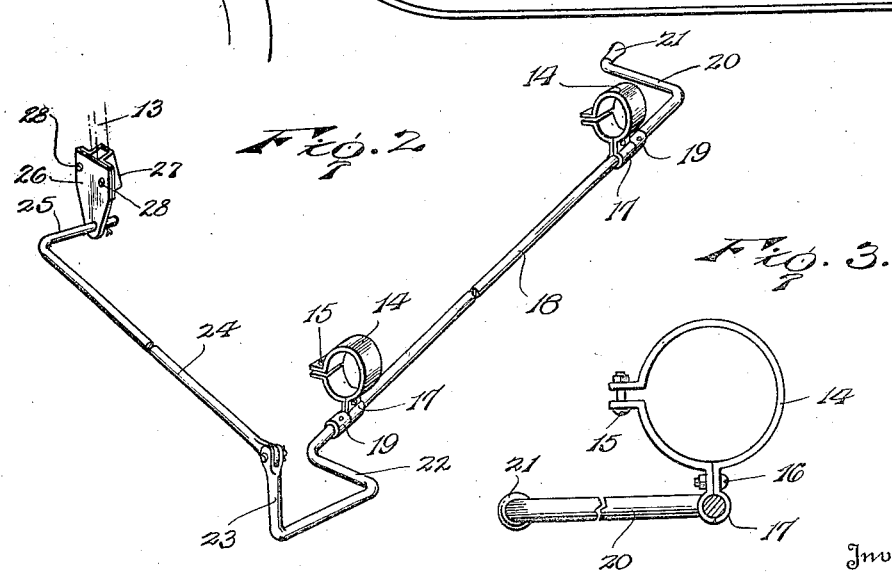
Inventors
W. C. Hershey.
R. J. Hanchette.
By Lacey & Lacey, Attorneys Patented July 22, 1924.

1,502,193

UNITED STATES PATENT OFFICE.

WILLIAM C. HERSHEY AND REX J. HANCHETTE, OF McALESTER, OKLAHOMA.

HEADLIGHT-SWITCH-OPERATING DEVICE FOR MOTOR VEHICLES.

Application filed September 11, 1922. Serial No. 587,630.

*To all whom it may concern:*

Be it known that we, WILLIAM C. HERSHEY and REX J. HANCHETTE, citizens of the United States, residing at McAlester, in the county of Pittsburg and State of Oklahoma, have invented certain new and useful Improvements in Headlight-Switch-Operating Devices for Motor Vehicles, of which the following is a specification.

This invention relates to an improved headlight switch operating device for motor vehicles and seeks, as one of its principal objects, to provide a device whereby the headlight switch upon the instrument board of the vehicle may be readily thrown to dim the headlights of the vehicle without the necessity of reaching forward to grasp the switch.

A further object of the invention is to provide a device embodying a lever operated rod which may be mounted upon the steering post and connected with the switch lever in such manner that the switch lever may be thrown in either one direction or the other simply by swinging the lever of said rod.

And the invention has as a still further object to provide a device which will be simple in its construction and which may be readily applied to a motor vehicle without the necessity for any structural change therein.

Other and incidental objects will appear hereinafter.

In the drawings:

Figure 1 is a side elevation showing our improved device in connection with a conventional motor vehicle, parts being broken away and illustrated in section, Figure 2 is a perspective view showing the device in detail, and Figure 3 is a detail sectional view on the line 3—3 of Figure 2, looking in the direction of the arrows.

Referring now more particularly to the drawings, we have, for convenience, shown our improved device in connection with a conventional motor vehicle having the usual steering post 10. The instrument board of the vehicle is indicated at 11 and mounted upon the board is the customary headlight switch 12 comprising a lever 13 which may be swung in one direction for fully energizing the headlights of the vehicle and may be swung in the opposite direction for dimming the headlights. As will be seen, it is necessary for the driver, in order to operate the switch lever, to reach forwardly in order to grasp the lever. This, as is well known, often proves very inconvenient and involves a certain element of danger in that one hand of the driver must be released from the steering wheel. The present invention, therefore, seeks to overcome these difficulties.

In carrying the invention into effect, we employ spaced supporting clamps 14 which, as shown in detail in Figure 3, are split so that the clamps may be readily arranged to embrace the steering post 10 and connecting the ends of said clamps are bolts 15 which may be adjusted for tightly binding the clamps about the post, the clamps being arranged in suitably spaced relation longitudinally of the post. As also best brought out in Figure 3, the clamps are each preferably formed of companion resilient plates secured together by bolts 16 and having corresponding ends thereof bowed to fit the steering post while opposite corresponding ends of said plates are bowed to define sleeves 17. The clamps are applied to the steering post in such manner that the sleeves 17 are disposed beneath the post alining with each other and journaled through said sleeves is an operating rod 18 upon which are adjustably fixed collars 19 coacting with the sleeves for limiting the rod against endwise movement. At its upper end, the rod is bent to provide a hand lever 20 having a handle 21 thereon while near its lower end the rod is offset, as indicated at 22, to extend laterally from beneath the steering post and is provided with a terminal upstanding arm 23 spaced at the adjacent side of the post. Pivotally connected at one end to said arm is a pitman rod 24 which, as brought out in Figure 1, lies behind the plane of the lower edge of the instrument board 11 of the vehicle and formed on the rod at its opposite end is a laterally directed terminal 25 projecting forwardly beneath the instrument board. Pivoted upon said terminal is a clamp 26. This clamp may be formed from suitable resilient sheet metal and includes a flat body plate to which is secured a channel shaped clamping plate 27 shaped to embrace the switch lever 13. Extending through the plates are bolts 28 or other suitable fastening devices adjustable for clamping the lever between the plates.

As will now be readily understood in view of the preceding description, by swinging the lever 20 in one direction, the arm 23 at the lower end of the operating rod 18 will be rocked for shifting the rod 24 endwise when the clamp 26 will turn slightly upon the terminal 25 of said rod so that the rod will act to swing the clamp and accordingly swing the switch lever 13 for dimming the headlights of the vehicle. On the other hand, by swinging the lever 20 of the rod 18 in the opposite direction, the switch lever 13 may be swung to fully energize the headlights while by disposing the lever 20 in a medial position, the headlights of the vehicle may be extinguished. As will be observed, the lever 20 is located immediately beneath the steering wheel of the vehicle and will thus be conveniently accessible so that the headlight switch may be operated without trouble or incident hazard and while we have illustrated and described the device as an accessory, still it is to be understood that the device may, of course, be embodied in the vehicle as a regular part of the structure thereof and we accordingly reserve the right to such a variation.

Having thus described the invention, what is claimed as new is:

1. The combination with a motor vehicle including a steering post, instrument board and headlight switch, of a manually operable switch operating rod rotatably mounted on the steering post and having its lower end offset and terminating in an upstanding arm, a clamp engaging the headlight switch lever, and a pitman rod lying behind the lower edge of the instrument board and having one end thereof pivotally connected to the upstanding arm of the operating rod and its other end provided with a laterally directed terminal pivotally connected with the lower end of said clamp.

2. A headlight switch operating device for motor vehicles including a rotatable operating rod having its lower end offset and terminating in an upstanding arm, means for holding the rod in position on a steering post, a clamp adapted to receive the headlight switch lever and provided with a back plate having an opening therein, and a pitman rod having one end thereof pivotally connected with the upstanding arm of the operating rod and its other end provided with a laterally directed terminal loosely fitting within the opening in the back plate of the clamp whereby when the operating rod is rotated the clamp will be tilted to actuate the switch and dim the headlights.

In testimony whereof we affix our signatures.

WILLIAM C. HERSHEY. [L. S.]
REX J. HANCHETTE. [L. S.]